April 14, 1964   E. J. DI IANNI   3,129,333
BROAD RANGE RADIATION METER CIRCUIT
Filed Sept. 16, 1960   2 Sheets-Sheet 1
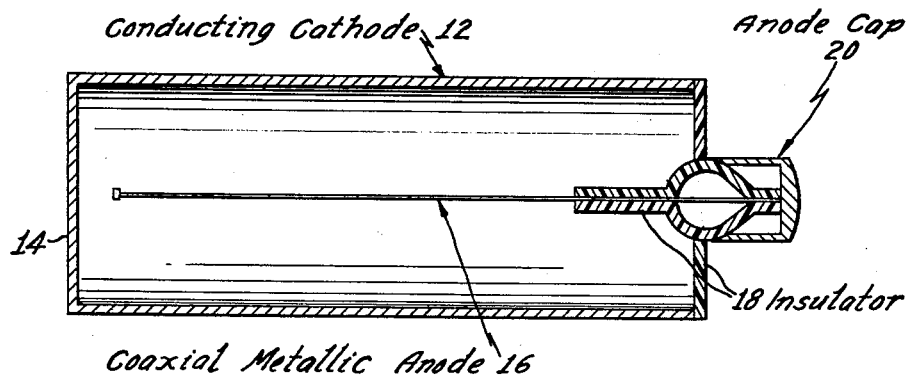
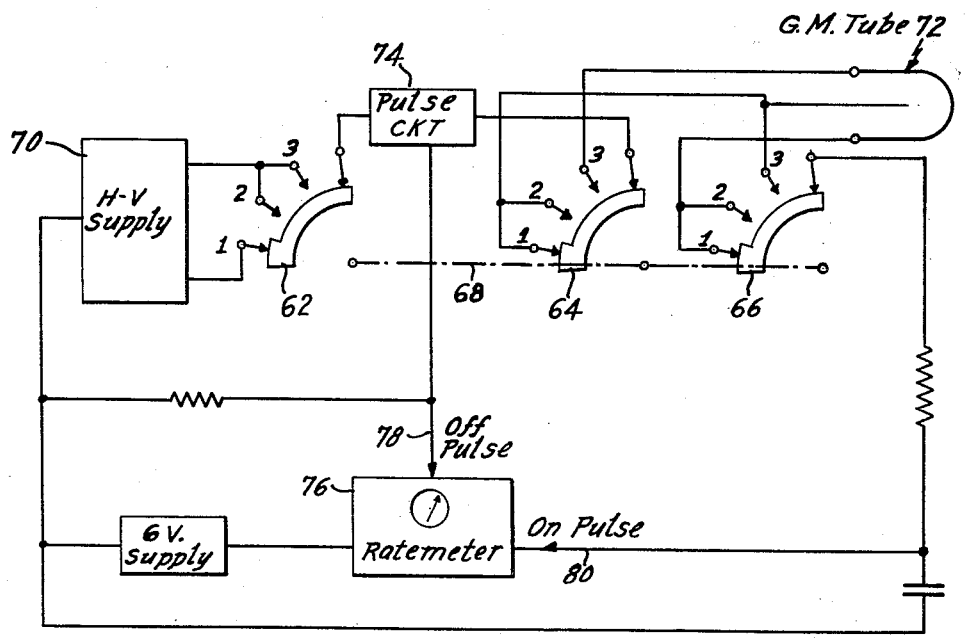
INVENTOR.
ELMO J. DIIANNI
BY Karl Huber
James E. Bryan
Alan C. Rose
ATTORNEYS

United States Patent Office 3,129,333
Patented Apr. 14, 1964

3,129,333
BROAD RANGE RADIATION METER CIRCUIT
Elmo J. Di Ianni, Mountain Lakes, N.J., assignor to Nuclear Corporation of America, Denville, N.J., a corporation of Delaware
Filed Sept. 16, 1960, Ser. No. 56,485
2 Claims. (Cl. 250—83.6)

This invention relates to radiation detection apparatus, and more particularly to wide range instruments using Geiger-Müller tubes.

A Geiger-Müller tube is normally gas filled and has a concentric geometry with an outer cylindrical cathode and a thin central coaxial anode. When radiation such as a gamma ray is incident upon the cathode, an electron may be released. As the electron is accelerated toward the central anode, the gas filling of the tube becomes ionized and an output pulse is produced.

At high levels of incident radiation, a new pulse of incident radiation may arrive before the Geiger-Müller tube is de-ionized. Under these conditions, the output reading is not accurate, and the tube may block. To permit higher radiation level detection, it has previously been proposed to pulse the Geiger-Müller tube from a level below the threshold voltage necessary for ionization into the active region. With such arrangements, high level radiation fields may be accurately measured. At still higher fields, however, pulse operation of the Geiger-Müller tube with conventional forward potentials reaches a limit in sensitivity as a result of the time interval required for the generation and transmission of a count pulse. Thus, every time that the tube is pulsed to the operating state, an output pulse is obtained.

A principal object of the present invention is to extend the range of radiation detection instruments to a wider range, and to higher levels than has been possible up to the present time using Geiger-Müller tubes.

This object is achieved, in accordance with the present invention, by operating the Geiger-Müller tube by pulses in the reverse direction, i.e., with the small central electrode at a negative potential with respect to the large area outer electrode. The central electrode then becomes the cathode, instead of the larger area outer electrode. As the sensitivity is dependent upon cathode area, the pulsed reverse operation provides much lower sensitivity. Accordingly, the resultant radiation detection instrument provides accurate readings even at very intense radiation field levels.

The instrument has the significant advantage of extending the range of conventional radiation detection apparatus by a factor of several thousand, without greatly increasing its complexity.

Other objects, features and advantages of the invention will become apparent from a consideration of the following detailed description and the accompanying drawing, in which:

FIG. 1 shows a conventional Geiger-Müller radiation detection tube;

FIG. 3 is a schematic circuit diagram of a three-range radiation detection circuit, in accordance with the invention.

Figure 2:
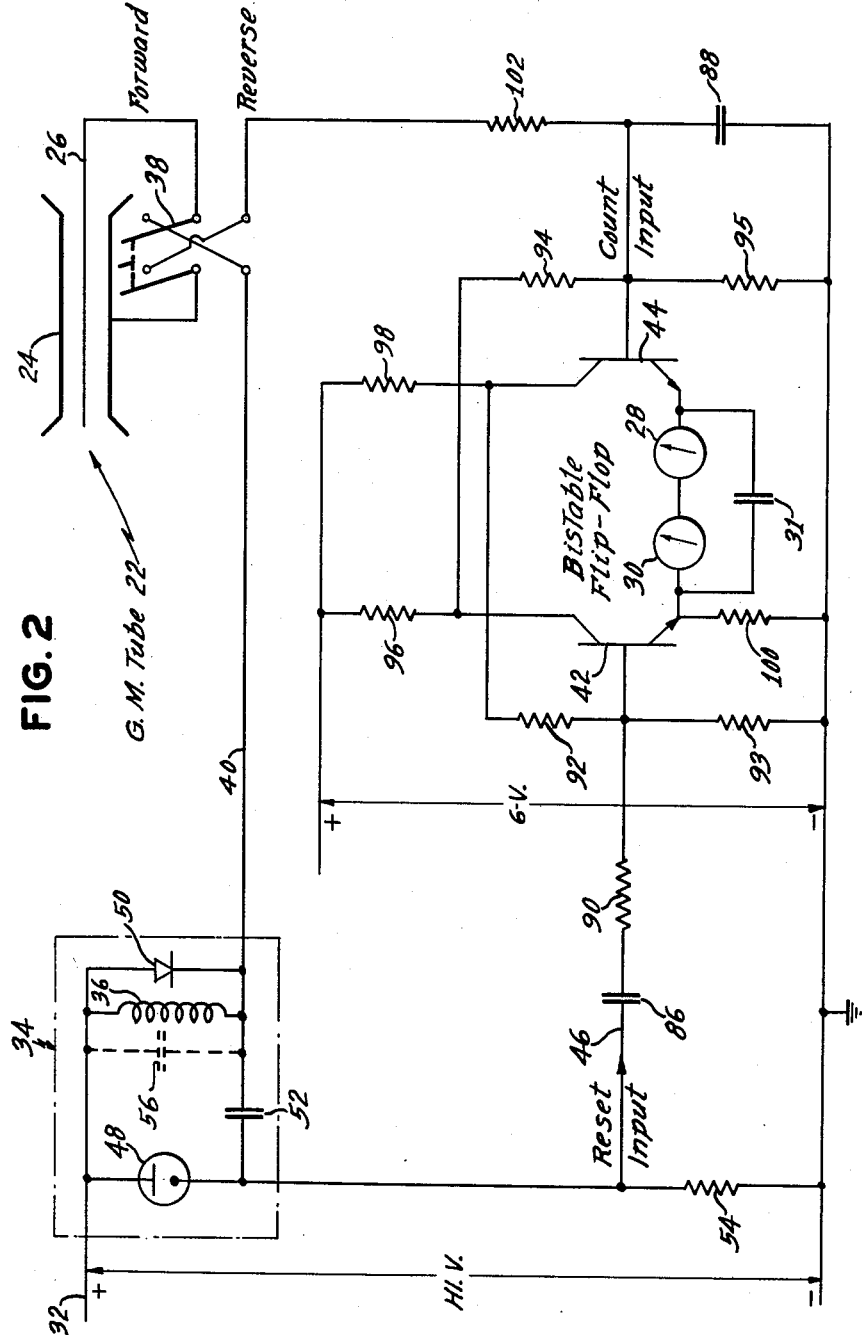
FIG. 2 is a circuit diagram of a radiation detection circuit having two ranges, in accordance with the invention.

With reference to the drawings, the conventional Geiger-Müller tube of FIG. 1, and various known techniques for operating it in radiation detection circuits, will first be discussed. Subsequently in this specification the novel circuits of FIGS. 2 and 3 will be described.

The conventional Geiger-Müller tube of FIG. 1 includes a generally cylindrical cathode 12 of conducting material. The cathode 12 may also extend to close one end 14 of the cylinder. The central coaxially anode 16 is a fine conducting wire. Because of the high voltages applied between the anode and the cathode, the central anode 16 is spaced from the cathode 12 by the insulating material 18. This insulating material also serves to close the envelope of the tube. A suitable conducting anode cap 20 is also provided for making electrical connection to the anode.

The tube is normally operated under D.C. conditions, with the outer electrode negative with respect to the anode. When operated in this manner, useful response to radiation fields is limited by the tube dead time. As the field intensity is increased, dead time losses occur, the average pulse size produced by the detector is reduced, and the tube response drops significantly. Further increases in field intensity will ultimately "block" the Geiger-Müller tube, so that no output pulses are produced. The mechanism by which counts are produced by a Geiger-Müller tube is adequately described by S. A. Korff, in his book entitled "Electron and Nuclear Counters, Theory and Use," D. Van Nostrand Co., Inc., New York, 1946. In brief, the mechanism for counting gamma radiation when the tube is operated under normal D.C. conditions is as follows:

A gamma photon impinges on the cathode of the Geiger-Müller tube, and a probability exists that this photon will interact with the wall material causing an electron to be ejected into the gaseous volume of the tube. Under the action of the electric field, the electron is accelerated toward the anode, producing further electrons by collision. These secondary electrons are also accelerated toward the anode, in turn producing further ionization. As a result of this process, a localized avalanche is formed in the vicinity of the wire, which is normally the anode. By photoionization of the gas, this avalanche spreads across the length of the tube producing a discharge pulse, or count.

As a result of this discharge, a preponderance of positive ions remain in the vicinity of the anode wire. These ions form an annular positive ion sheath around the wire which slowly migrates to the cathode. The proximity of the positive ion sheath to the anode effectively reduces the electric field strength near the wire so that no avalanche, and therefore no pulses, can be produced by the tube. This condition obtains until the movement of the positive ion sheath toward the cathode and away from the anode allows the electric field to build to the point where an avalanche can occur again. The interval from the start of a pulse to the time when the electric field has attained sufficient strength to produce another count is called the "dead" time. It is this dead time which limits the magnitude of the radiation fields that can be measured by a Geiger-Müller tube operated in this manner. If the surface area of the cathode is reduced, fewer gamma photons are intercepted and higher fields can be measured. This is done, however, at the expense of tube sensitivity, that is, the response to low fields is also reduced.

Another technique which has been used to reduce the sensitivity of a Geiger-Müller tube is pulsed operation. In this technique, a D.C. voltage, with the wire positive and the cylinder negative, is applied to the Geiger-Müller tube at a level which is below the tube threshold voltage at which the tube enters the "Geiger" region. A positive voltage pulse which is of short duration with respect to the tube's normal dead time is then superimposed on the D.C. level at a constant repetition rate. The amplitude of the superimposed voltage pulse carries the tube into its operating region for a time interval, frequently termed the "on" time, which is equal to the duration of each voltage pulse. The tube will produce a single count only when there is a coincidence between a voltage pulse and the release of an electron, derived from a gamma photon striking the cathode into the tube. The probability of obtaining a count is given by the formula:

$$f = 1 - e^{-nt}$$

where $f$ = probability of getting a count,
$n$ = number of counts that would be obtained under D.C. operation if no dead time losses occurred.
$t$ = duration of the individual superimposed voltage pulse, or on time, in seconds.

The range extension factor is the ratio of the tube dead time to the triggering pulse width.

Another technique discussed in the literature, but rarely, if ever, used in practice involves operating the Geiger-Müller tube under pure D.C. conditions, but with reversed polarity so that the central wire is now negative with respect to the outer, large area electrode. Electrons which are ejected from the outer, large area electrode by gamma photons are not counted since they are almost immediately collected by the positive potential on this electrode. The source of counts would be electrons initiated in the anode wire or in the gas closely surrounding the wire. The sensitive volume of the counter would be only a limited volume around the wire where the electric field is high enough to result in ionization of the gas by collision. Thus, by reversing the potential, the sensitivity of the tube is greatly reduced by a factor approximately equal to the ratio of active photosensitive metal surfaces of the wire and cylinder. The range extension factor is therefore variable depending on tube dimensions, but a range extension factor of 50 would be easily attainable with conventional tubes, if this mode of operation were practical. However, tubes are rarely, if ever, used in this manner since it results in unstable operation because the usable "Geiger" plateau for the tube is extremely small or nonexistent.

As discussed above, the present invention involves further extension of the range of Geiger-Müller tubes by normally biasing the tube in the reverse direction, with the small electrode negative and the large area electrode positive, at a potential below the threshold level for a reverse biased tube. The tube is periodically pulsed into the operating region as described below in connection with FIG. 2.

In FIG. 2 the Geiger-Müller tube 22 includes an outer electrode 24 and a central conductor 26 which is the normal anode of the tube. Output meters 28 and 30 having different ranges ore provided, and a capacitor 31 is connected in parallel with them. The operating potential for the Geiger-Müller tube 22 is provided by the D.C. voltage supplied on lead 32 and a pulse circuit 34. The voltage on lead 32 may, for example, be about 580 volts. It is applied across the electrodes of the Geiger-Müller tube through inductor 36 and the double pole, double throw switch 38. The voltage applied to the Geiger-Müller tube is just below the threshold level for operation either in the forward or the reverse direction.

With regard to the operation of the circuit of FIG. 2, in brief, pulses from circuit 34 are applied on lead 40 to periodically energize the Geiger-Müller tube to the active region, either in the forward or the reverse direction depending on the position of the switch 38. Concurrently, with the application of a pulse to the Geiger-Müller tube 22, the bistable flip flop including transistors 42 and 44 is reset by a pulse on lead 46 to the state in which transistor 42 is conducting and transistor 44 is de-energized. Under these conditions, the output meters 28 and 30 are not energized. If a radiation pulse is received during the brief energized period, as determined by the pulse applied on lead 40, the flip flop is shifted to its alternative state in which transistor 44 is conducting and transistor 42 is de-energized. An increment of current is then applied to meters 28 and 30 in the emitter circuit of transistor 44. The meters 28 and 30 in combination with the capacitor 31, thus perform an integrating or averaging function, and indicate the radiation level incident at the Geiger-Müller tube 22. In one representative example, the pulse repetition rate was approximately 1000 pulses per second, and the millimeters 28 and 30 were of a conventional commercially available type.

The pulse generation circuit 34 includes a gas tube 48, a diode 50, and a capacitor 52, in addition to the inductor 36. The resistor 54, which appears outside of the block 34, also plays a part in the timing of the relaxation oscillator. The full voltage between lead 32 and ground, is 580 volts. The gas tube 48 breaks down at a level of about 400 volts. Following breakdown, the voltage across the tube 48 drops to a low voltage of about 100 volts. The current through tube 48 consists primarily of the charging current of the shunt capacitance 56, which is shown in dashed lines in the circuit of FIG. 2. The capacitor 52 supplies this charging current, and, as a result, discharges from 400 to 300 volts. When tube 48 starts to deionize, the shunt capacitance 56 is charged to approximately 190 volts, and the current through inductance 36 is very nearly equal to 0. The capacitance 56 is then discharged sinusoidally through conductor 36. Diode 50 prevents voltage overshoot and oscillation.

Following a time period sufficient to re-charge condenser 52 so that the voltage across the gas tube 48 is equal to 400 volts, the relaxation oscillator provides another output pulse. As mentioned above, these successive output pulses not only energize the Geiger-Müller tube 22, but also reset the bistable flip flop to the conduction state in which transistor 42 is conducting and transistor 44 is de-energized.

By reversing the switch 38 so that the normal anode 26 is negative in potential with respect to the normal cathode 24 of the Geiger-Müller tube 22, the output level of the radiation detector is greatly reduced. The D.C. voltage level for reversed operation is again below the threshold level, and it is pulsed into the operative range. The effect of such operation is to compound the range extension factors inherent in the reduced cathode area of the normal anode with respect to the cathode, and in the pulse operation technique.

Furthermore, the disadvantages which would otherwise be incurred in operating the tube under D.C. reversed potentials are removed when the tube is pulsed from below threshold to the operative region. Since the superimposed voltage pulses are short compared with the tube dead time, only one output pulse can be obtained during the "on" time established by each voltage pulse. When the voltage pulse is removed, the tube voltage is brought below threshold, and the discharge is quenched, thus eliminating the problems of stability produced by the short "Geiger" plateau previously discussed.

The circuit of FIG. 3 is similar to that of FIG. 2 but includes three ranges of operation instead of only two. In addition, the circuit of FIG. 3 is schematic as it merely uses circuit components which have, in general, been shown in detail in FIG. 2.

In the circuit of FIG. 3, a range switch including three decks 62, 64 and 66, is provided. These three decks are mechanically linked as indicated by the dashed line 68. The high voltage supply 70 of FIG. 3 has high and low voltage taps, providing voltages of 700 and 580 volts in switch positions 1 and 2—3, respectively. In switch position 1, as shown in FIG. 3, the 700 volt tap is connected to the Geiger tube in the normal direction, with the central wire of the Geiger tube 72 at a positive potential with respect to the outer wall. In this regard, it may be noted that the positive voltage is supplied through switch deck 64 to the anode, and that a negative return is provided from the cathode by switch deck 66.

The pulse circuit 74 is included in the circuit even for the continuous mode of operation using switch position 1. Under these operating conditions, the function of the pulse circuit is to avoid a low or "zero" meter output indication under high radiation conditions. This is accomplished by conduction of the superimposed voltage pulses through the ionized G-M tube to the meter circuit thereby keeping the meter off scale.

The rate meter 76 of FIG. 3 includes the bistable flip flop, in addition to the two meters of FIG. 2. Lead 78 corresponds to the resetting input 46 of the FIG. 2, and the lead 80 of FIG. 3 corresponds to the input of the base of transistor 44 in FIG. 3.

Switch positions 2 and 3 correspond precisely to the two switch positions of the circuit of FIG. 2. In switch position 2 the Geiger-Müller tube is pulsed in the forward direction, and in the switch position 3 it is pulsed in the reverse direction. For a type BS–1 Geiger-Müller tube, the threshold level for both forward and reverse operation is about 600 volts. Accordingly, pulses of 190 volts from a base voltage level of 580 volts are suitable for both forward and reverse pulsed operation.

For completeness, one representative set of circuit components which may be used for the circuit of FIG. 2 are as follows:

| | |
|---|---|
| G.M. tube 22 | 5979/BS–1. |
| Tube 48 | Type 7617. |
| Diode 50 | 1N538. |
| Transistors 42, 44 | 2N445A. |
| Capacitor 52 | 140 micromicrofarads. |
| Capacitor 31 | 1500 microfarads. |
| Capacitor 86 | 5 micromicrofarads. |
| Capacitor 88 | 22 micromicrofarads. |
| Inductor 36 | 200 millihenries. |
| Resistor 54 | 30 megohms. |
| Resistor 90 | 1 megohm. |
| Resistors 92 to 95 | 27,000 ohms. |
| Resistors 96, 98 | 6,800 ohms. |
| Resistor 100 | 680 ohms. |
| Resistor 102 | 100,000 ohms. |

The valve of the inductance 36, the capacitor 52 and the resistance 54 may, of course, be varied to change the constants of the pulse circuit in a known manner. In addition, capacitance of selected values may be inserted in parallel with the shunt capacitance 56 of tube 48.

An important advantage of the present invention is that a single Geiger-Müller tube can be made to cover an extremely wide range of radiation field intensities. Thus, for very low field intensities, the tube is operated in a conventional manner with essentially D.C. operation with the anode positive and the cathode grounded. Conventional quenching circuitry such as the pulsing arrangement described above may be provided. For intermediate radiation fields, the Geiger-Müller tube is operated with forward or normal polarities by using pulses to periodically enable the tube. For very high fields, the potential is reversed, and pulses are again employed, to periodically enable the tube. In this way, a single detector can be used to cover a range presently requiring several Geiger-Müller tubes. This has obvious advantages in radiation detection instruments, in which size and weight limitations as well as wide range are important. Furthermore, the circuits described above are directly applicable to battery-operated portable instruments.

For completeness, it is noted that S. W. Lichtman discusses "Pulsed Geiger-Müller Tube Operation" at pages 22 through 27 of Nucleonics, January, 1953, volume 11, No. 1. The use of Geiger-Müller tubes biased with a D.C. potential in the reversed direction is mentioned at pages 84 and 85 of "Electron and Nuclear Counters, Theory and Use" by A. Korff, mentioned above. It may be noted, however, that the poor voltage sensitivity and quenching problems mentioned in the present specification are also clearly indicated by this reference.

In accordance with a particularly advantageous feature of the invention, the pulse circuit 74 of FIG. 3 performs a useful function in each of the three modes of operation of the circuit. Thus, in the low range switch position, it provides pulses which are transmitted directly through the Geiger-Müller tube, to provide a full scale meter reading under high radiation conditions when the tube is in the continuously ionized condition. Under pulse operating conditions, using the intermediate switch position 2 and the high level radiation detection switch position 3, the pulse circuit 74 serves to switch the Geiger tube into its operating states, in the normal or forward direction, and with reversed potentials, respectively. Thus, the pulse circuit is not merely an adjunct for high level conditions, but forms an integral part of the complete circuit, and is used for weak, intermediate and intense radiation field detection modes of operation.

It is to be understood that the above described arrangements are illustrative of the application of the principles of the invention. Numerous other arrangements may be devised by those skilled in the art without departing from the spirit and scope of the invention.

What is claimed is:

1. A radiation detector, comprising a Geiger-Müller type tube having one electrode which has a much larger area than the other, said tube having a predetermined threshold biasing level for the reverse voltage direction, means for biasing said tube in the reverse direction with the small area electrode negative with respect to the larger area electrode at a voltage level below said predetermined threshold level, and means for superposing pulses on said biasing voltage periodically to drive said smaller area electrode to a voltage level above said reverse voltage direction threshold level.

2. A radiation detector, comprising a Geiger-Müller type tube having one electrode which has a much larger area than the other, said tube having a predetermined threshold biasing level for the reverse voltage direction, means for biasing said tube in the reverse direction with the small area electrode negative with respect to the larger area electrode at a voltage level below said predetermined threshold level, and means for superposing pulses which are short with respect to the dead time of said tube on said biasing voltage periodically to drive said smaller area electrode to a voltage level above said reverse voltage direction threshold level.

References Cited in the file of this patent

UNITED STATES PATENTS

| | | |
|---|---|---|
| 2,581,305 | Skellett | Jan. 1, 1952 |
| 2,672,561 | Lichtman | Mar. 16, 1954 |
| 2,874,354 | Bell | Feb. 17, 1959 |

OTHER REFERENCES

Reduction of the Natural Insensitive Time in G.M. Counters by Simpson, The Physical Review, vol. 66, Nos. 3 and 4, Aug. 1 and 15, 1944, pp. 39 to 47.

Electron and Nuclear Counters, by Korff, fourth printing, D. Van Nostrand Co., N.Y., Jan. 1948, pp. 84 and 85.